United States Patent
Sullivan

[15] 3,681,444
[45] Aug. 1, 1972

[54] PREPARATION OF PARA NITROBENZOIC ACIDS AND 4'-NITRO-4-BIPHENYLCARBOXYLIC ACIDS

[72] Inventor: Robert H. Sullivan, Woodbury, N.J.
[73] Assignee: E. I. du Pont de Nemours and Company, Wilmington, Del.
[22] Filed: Sept. 21, 1970
[21] Appl. No.: 74,194

[52] U.S. Cl.........260/515 R, 260/507 R, 260/515 P, 260/524 N
[51] Int. Cl..............................................C07c 79/46
[58] Field of Search............260/515 R, 515 P, 524 N

[56] References Cited

UNITED STATES PATENTS

| | | | |
|---|---|---|---|
| 1,292,266 | 1/1919 | Datta et al. | 260/622 |
| 2,815,373 | 12/1957 | Mayurnik | 260/524 |
| 3,515,748 | 6/1970 | Olson et al. | 260/515 |

FOREIGN PATENTS OR APPLICATIONS 705,195  3/1954  Great Britain

OTHER PUBLICATIONS

Datta et al., Jour. Amer. Chem. Soc., 41, pp. 2,039-48 (1919)

*Primary Examiner*—James A. Patten
*Attorney*—Theodore C. Gregory

[57] ABSTRACT

Preparation of p-nitrobenzoic and 4'-nitro-4-biphenylcarboxylic acids by contacting a p-sulfo benzoic acid or 4'-sulfo-4-biphenylcarboxylic acid with at least one molar proportion of nitric acid as a 5–60 percent by weight aqueous solution in the liquid phase at 120° C.–300° C. to displace the sulfo group by a nitro group and by contacting a benzenesulfonic acid or a 4-biphenyl sulfonic acid bearing an oxidizable alkyl group para to the sulfo group with aqueous nitric acid or a mixture of nitric acid and molecular oxygen containing gas at a temperature of 120°–300° C. in a single overall reaction.

14 Claims, No Drawings

PREPARATION OF PARA NITROBENZOIC ACIDS AND 4'-NITRO-4-BIPHENYLCARBOXYLIC ACIDS

INTRODUCTION

This invention relates to a process for the preparation of p-nitrobenzoic acids and 4'-nitro-4-biphenylcarboxylic acids. More specifically this invention relates to a process for replacing a sulfonic acid group para to a carboxylic acid group by a nitro group and a one-step method for preparing p-nitrobenzoic and 4'-nitro-4-biphenylcarboxylic acids by oxidation of the alkyl substituent of p-alkyl benzene and biphenylsulfonic acids and displacement of the sulfo group by the nitro group.

Para-nitrobenzoic acids have been prepared by nitrating an alkylated benzene, followed by oxidizing to the corresponding nitrobenzoic acid. However, the nitration of alkylbenzenes produces isomers thereby creating the problem of separating these isomers. Such processes have a further disadvantage involving the disposition of the unwanted isomers. When nitrotoluene is prepared for example 60 percent of the isomers produced were unwanted o-isomer thereby creating considerable waste of materials.

Oxidation with nitric acid of the alkyl side chains of a benzene ring to carboxylic acid groups is disclosed in U.S. Pat. No. 2,815,373. In the presence of sulfonic acid groups, British Pat. No. 705,195 teaches that this oxidation takes place without disturbing the sulfonic acid group. Thus in order to prepare p-nitrobenzoic acid, further treatment is required for the replacement reaction.

It is also known that reaction of aromatic sulfonic acids with concentrated nitric acid or nitric-sulfuric acid mixtures leads to ring nitration, with the nitro group entering a position meta to the sulfo group and leaving the sulfo group intact. In some instances, as summarized by Suter, The Organic Chemistry of Sulfur, John Wiley and Sons, New York, 1944, pages 406–412, where the aromatic ring contains an hydroxyl or a halo substituent para to the sulfo group, displacement of sulfo by nitro occurs. In general, however, a position ortho or para to the hydroxyl is nitrated before the sulfo group is removed. In this connection, Datta and Varma, J. Am. Chem. Soc., 412,039–2,048 (1919) disclose that by reaction of nitrous gases with carboxylic acids of aromatic hydroxy compounds the sulfo groups can be replaced, but that if the compound does not already contain an hydroxyl group the replacement does not take place at all.

The prior art does not disclose that sulfo groups in p-sulfobenzoic acids can be replaced by nitro on treatment with nitric acid. Rather the art suggests that replacement will not occur and that one should expect to obtain nitro-sulfo-benzoic acids.

BRIEF SUMMARY OF THE INVENTION

It is an object of this invention to provide an improved process for the preparation of p-nitrobenzoic and 4'-nitro-4-biphenylcarboxylic acids. It is another object to prepare p-nitrobenzoic acids and 4'-nitro-4-biphenylcarboxylic acids from p-sulfobenzoic and sulfobiphenylcarboxylic acids. It is still another object of this invention to provide a "one-step" process for the preparation of p-nitrobenzoic and 4'-nitro-4-biphenylcarboxylic acids from p-alkylbenzene and biphenylsulfonic acids or derivatives thereof. Other objects will appear hereinafter as the description of the invention proceeds.

In accordance with the invention it has been found that p-nitro-benzoic and 4'nitro-4-biphenylcarboxylic acids can be prepared by the process which comprises contacting a sulfobenzoic or sulfobiphenylcarboxylic acid of the formula

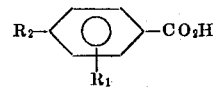

wherein $R_1$ is selected from the group consisting of hydrogen and carboxyl and $R_2$ is selected from the group consisting of sulfo and a p-sulfophenyl group, wherein sulfo is defined as $SO_3H$ or a derivative hydrolyzable thereto under process conditions, with at least 1 mole of nitric acid as a 5–60 percent by weight aqueous solution in the liquid phase at an elevated temperature and for a time sufficient to displace said sulfo group by a nitro group.

It has been further found that p-nitrobenzoic and 4'-nitro-4-biphenylcarboxylic acids can be prepared by the process which comprises reacting p-alkyl benzene sulfonic acids or biphenyl sulfonic acids of the formula,

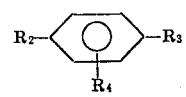

where $R_3$ is a primary or secondary alkyl group of one to five carbon atoms, $R_4$ is selected from the group consisting of hydrogen, a primary or secondary alkyl group of one to five carbon atoms and a carboxyl group, and $R_2$ is selected from the group consisting of sulfo and a p-sulfophenyl group wherein sulfo is defined as $-SO_3H$ or a derivative hydrolyzable thereto under process conditions with at least $1 + 2y$ moles of nitric acid as a 5–60 percent by weight aqueous solution wherein $y$ is the number of carbon atoms in $R_3$ and $R_4$ combined when $R_3$ and $R_4$ are alkyl or a combination of $1 + y$ moles of nitric acid as a 5–60 percent by weight aqueous solution in addition to at least $y$ moles of oxygen as a molecular-oxygen containing gas at elevated temperatures optionally with an oxygen oxidation promoter such as acetone, HBr, $Cu(NO_3)_2$ and $NH_4VO_3$, or the like.

It will be understood from the above and the description to follow that the terms p-nitrobenzoic and 4'-nitro-4-biphenylcarboxylic acids include dicarboxylic acids such as nitrophthalic acid wherein the nitro and one carboxylic group are para to each other and 4-(p-nitrophenyl)-phthalic acid wherein the nitro of one phenyl ring and one carboxyl group of the other phenyl ring are para to one another.

Under the conditions of this invention the replacement of the sulfonic acid group in sulfocarboxylic acids and both oxidation and replacement of the sulfonic acid group of the p-alkyl benzene sulfonic acids or biphenyl sulfonic acids of this invention can be achieved simply and directly, in a single step if desired.

Oxidation of the $R_3$, alkyl side chain to the sulfo-substituted aromatic carboxylic precedes displacement of the sulfo group by the nitro group to form the nitro-substituted aromatic carboxylic acid. The process of displacement of the sulfo group with the nitro group as well as the combined oxidation and displacement can be conducted in a single reactor and thus, where aqueous nitric acid is employed for effecting both oxidation and displacement, the process may be regarded as a one-step process.

The sulfobenzoic acids and sulfobiphenyl carboxylic acids of this invention include p-sulfobenzene mono- and di-carboxylic acids and p-sulfophenylbenzene mono- and di-carboxylic acids wherein the sulfo group in the one phenyl ring is in para relationship with a carboxylic group in the second phenyl ring. Representative examples of such compounds are 4-sulfo-benzoic acid, 4-sulfo-phthalic acid, 4-(p-sulfophenyl)-benzoic acid, 4-(p-sulfophenyl)-phthalic acid, and 4-(p-sulfophenyl)- isophthalic acid.

Representative examples of the p-alkyl benzene sulfonic acids and biphenyl sulfonic acids of this invention are p-toluene sulfonic acid, potassium salt of p-toluene sulfonic acid, p-ethylbenzene sulfonic acid, potassium salt of p-ethylbenzene sulfonic acid, p-cumene sulfonic acid, 4'-methyl-4-diphenyl sulfonic acid, 3,4-dimethyl-benzene sulfonic acid, sodium salt of 3,4-dimethyl-benzene sulfonic acid, p-n-butylbenzene sulfonic acid, p-n-pentylbenzene sulfonic acid, 3,4-di-n-butylbenzene sulfonic acid, 3,4-di-n-pentylbenzene sulfonic acid, methyl-p-toluenesulfonate, copper-p-toluenesulfonate, cobalt p-toluenesulfonate, nickel p-toluenesulfonate and calcium p-toluenesulfonate. In these starting compounds both the sulfo and the carboxylic groups are normally in the free acid forms but one or the other or both may be in the form of a derivative hydrolyzable to the acid form in aqueous nitric acid, such as an acid chloride, e.g., $SO_2Cl$ or $COCl$, an ester, e.g., $C_1$–$C_5$-alkyl sulfonate or carboxylate, and a metal sulfonate or carboxylate wherein the metal may be any salt-forming metal such as those of Groups I, II, III and IV and of the transition metal series, exemplified by Li, Na, K, Mg, Ca, Ba, al, Tl, In, Cu, Cd, Zn, Ti, Sn, Co, Ni and Fe. The preferred metals are sodium and potassium.

For the displacement reaction, aqueous nitric acid containing 5–60 percent by weight, preferably 15–30 percent by weight $HNO_3$, is employed in amounts sufficient to maintain the reaction mixture acid and to provide at least 1 mole $HNO_3$ per $SO_3H$ group replaced. Normally not more than 4 moles $HNO_3$, preferably 1 to 2 moles, is employed per sulfo group. The sulfocarboxylic compound and the nitric acid are heated together in the liquid phase at a temperature sufficient to effect the displacement reaction, usually between about 120° and 300° C., preferably between 180° and 250°C. The pressure should be sufficient to maintain the aqueous acid in the liquid phase. Pressures of 250–500 psig are suitable. Nitrogen or other inert gas may be used to provide pressure if needed.

Aqueous nitric acid, 5–60 percent by weight, preferably 15–30 percent by weight $HNO_3$, is employed as the oxidizing as well as the nitrating agent. The amount used when oxidation and displacement are both to occur varies with the number and size of the alkyl groups to be oxidized in the p-alkylbenzenesulfonic acid or the biphenyl sulfonic acid. With methyl-substituted arene sulfonic acid, the nitric acid is normally used in the amount of about 3-6 mols per each methyl group of the sulfonic acid or its derivative to be oxidized, preferably 4–5 mols per methyl group. The amount of nitric acid is critical. For example, if 2 mols of nitric acid per methyl group are used p-nitrobenzoic acid does not result when starting with p-methyl-benzenesulfonic acid. However, 3 mols of nitric acid per mol of sulfonic acid will give p-nitrobenzoic acid when starting with p-methylbenzenesulfonic acid. Where larger or additional oxidizable alkyl groups are present in the sulfonic acid or its derivative, the amount of nitric is increased about 2 mols per additional carbon atom. The amount of nitric acid required for the displacement and oxidation reaction may be shown as at least $1 + 2y$ moles where $y$ is the number of carbon atoms in the substituent alkyl group of the arene sulfonic acid. The preferred amount being $1 + 2y$ to $4 + 2y$ mols of nitric acid. When a combination of oxygen or oxygen containing gas is co-employed with the nitric acid, for example, when p-methylbenzenesulfonic acid is reacted, the nitric acid is used in the amount of about 2–5 mols per mol of the sulfonic acid with at least 1 mol of oxygen per side chain carbon atom, preferably 2.5–3.5 mols nitric acid per mol of the sulfonic acid with 1.5 mols of oxygen per side chain carbon.

The amount of nitric acid and oxygen as a molecular-oxygen containing gas required in the oxidation-displacement reaction may be shown as at least $1 + y$ mols of nitric acid (preferably $1 + y$ to $4 + y$ mols) and at least $y$ mols of oxygen as a molecular-oxygen containing gas (preferably $y$ to $1.5y$ mols) where $y$ is the number of carbon atoms in the substituent alkyl group of the arene sulfonic acid.

For the combination oxidation of the side chain and displacement of the sulfo group by nitro, the p-alkyl benzene sulfonic acids or the biphenylsulfonic acids and nitric acid are heated together under pressure at a temperature above 120° C. The reaction proceeds at temperature between 120° and 180° C. but the yield of the p-nitro compound tends to be low. However, this can be improved by using greater amounts of nitric acid. The reaction is preferably carried out from the 180°–250° C. Above 300° C. there is a tendency toward side reactions.

The reaction can take place at autogenous or higher pressures sufficient to maintain a liquid aqueous phase. Nitrogen or other inert gas may be supplied to aid in maintaining the reactants in the liquid phase. A pressure of about 250–450 p.s.i.g. is preferred. However, pressures as high as 1,200–1,400 p.s.i.g. may be used when an oxygen containing gas is used with nitric acid.

The optional oxygen oxidation promoters that may be used include HBr, $Cu(NO_3)_2$ and $NH_4VO_3$ and the like.

The mode of addition of reactants to the reaction vessel can be accomplished in several ways. The p-alkylbenzenesulfonic acid, the biphenylsulfonic acid or the sulfobenzoic acid or the sulfobiphenylcarboxylic acid reactant or a metal salt thereof, e.g., potassium salt, and nitric acid are charged into the reaction vessel, e.g., autoclave, the vessel closed and the contents heated with agitation for a period of time ranging from several minutes to 8 hours, depending upon the temperature selected. When the displacement is substantially complete the reaction vessel is cooled, the pressure is released and the contents discharged. The p-nitro product is recovered in the usual way by techniques well known in the art.

Whereas the sulfo-carboxylic acids are normally water-soluble, the nitro carboxylic acid products are normally water-insoluble and thus are conveniently recovered by filtration, or where necessary by concentrating or evaporating the reaction to dryness and extracting with suitable solvents for the nitro product. The product is purified if necessary by recrystallization or other techniques known to the art.

The sulfo-carboxylic acid starting materials for the displacement process of this invention are conveniently obtained by oxidation of an alkylbenzenesulfonic or an alkylbiphenylsulfonic acid wherein an alkyl group is in para relationship with a sulfo group. Such oxidations are well known in the art and have been effected for example with such side chain oxidizing agents as oxygen promoted by various catalysts, dilute nitric acid, and combinations thereof.

The mode of addition of reactants to the reaction vessel can be accomplished in several ways. The sulfo compound and nitric acid are charged into the reaction vessel, e.g., autoclave, the vessel closed and the contents heated with agitation for a period of time ranging from several minutes to 8 hours depending on the temperature selected. The reaction vessel is cooled, vented and the contents discharged.

Alternatively, the starting material selected from these indicated above and 2 mol equivalents of nitric acid per alkyl carbon are charged into the autoclave and heated to reaction temperature with agitation. The remaining 1–4 mol equivalents of nitric acid are added and the reaction continued. The charge is cooled and product isolated.

Another procedure consists of first heating nitric acid to the desired temperature and adding a solution of the potassium salt of the reactants indicated above in 15–30 percent nitric acid. The reaction mass is agitated at the required temperature for a period of 1 to 8 hours, preferably 3 to 6 hours, cooled and the product recovered.

The process of this invention can be utilized by a continuous process as well as batchwise. While most of this application is devoted to the batchwise process, the p-nitrocarboxylic acid can be produced continuously by the process of this invention. An illustration of the continuous process involving the reaction, e.g. of p-toluenesulfonic acid or a salt thereof and nitric acid of the appropriate concentration would be feeding both continuously into a reaction vessel equipped with agitation and maintaining the temperature at about 240° C. and under autogenous pressure for the oxidation-nitration one-step reaction. The reaction mass which includes p-nitrobenzoic acid is continuously discharged from the reaction vessel into an apparatus for reducing pressure and cooling such as a flash evaporator. The reaction mass is further cooled and led into a crystallizer from which the p-nitrobenzoic acid is recovered. Unreacted p-toluene sulfonic acid may be recycled back to the reaction vessel.

Most of the alkyl group oxidation disclosure is directed to the preferred use of nitric acid alone, however, the one-step reaction of this invention may be aided by the co-use of air or oxygen and the optional use of a promoter selected from the group consisting of a ketone, hydrobromic acid, and suitable metal compounds such as $Cu(NO_3)_2$ and $NH_4VO_3$.

The following examples illustrate the process. All references to percentages are by weight unless otherwise indicated.

EXAMPLE 1

A titanium autoclave was charged with 117.6 grams of p-benzoic acid sodium sulfonate (0.50 mol) and 0.282 milliliters of 20 percent aqueous nitric acid (1 mol) and heated under agitation at 220° C. for 4 hours. The autoclave was cooled, vented and opened and the contents filtered to recover p-nitrobenzoic acid which was washed with water and dried at 90° C. The yield was 59.3 grams (71 percent of theoretical) of p-nitrobenzoic acid m.p. 236°–238° C.

EXAMPLE 2

The procedure of Example 1 was followed except that 90 grams of the potassium salt of p-sulfobenzoic acid was used with 3 mols of nitric acid as a 20 percent by weight aqueous solution at 230° C. for 2 hours. About the same yield (43.8 grams) of p-nitrobenzoic acid was obtained m.p. 236°–238° C. P-sulfobenzoic acid can also be obtained by the HBr catalyzed oxygen-oxidation of p-toluene sulfonic acid as described by McIntyre and Ravens, J. Chem. Soc. 4,082 (1961) and by Keith and Chambers in U.S. Pat. No. 3,151,153 or by nitric acid oxidation of p-toluenesulfonic acid as described in British Pat. 705,195. The water soluble p-sulfobenzoic acid is conveniently recovered from the aqueous oxidation reaction mixtures as the sparingly soluble sodium or potassium salt as disclosed in the art.

EXAMPLE 3

Thirty-five grams (0.18 mol) p-toluenesulfonic acid monohydrate and 50 grams 35% $NHO_3$ (4.6:1 mol ratio of $HNO_3$: sulfonic acid) were placed in a 300 ml. stainless steel autoclave. The autoclave was pressured with nitrogen to 300 psig and heated to 180° C. To this mixture was added 100 grams of 35 percent by weight $HNO_3$, holding at 180° C., and a pressure of 400 psig. The mixture was maintained at this temperature for 3 hours. The reaction mixture was cooled, the product filtered, washed with water and dried. 6.6 grams of p-nitrobenzoic acid, m.p. 237°–238° C., were obtained.

It is essential for the displacement reaction that sufficient $HNO_3$ is present. The replacement of the $-SO_3$ group and the oxidation of the alkyl group in one step requires the use of at least 3 mols of 5–60 percent aqueous nitric acid or at least 2 mols of 5–60 percent aqueous nitric acid with 1 to 1½ mols of oxygen where oxygen is supplementing the nitric acid. At lower nitric acid levels the displacement reaction is incomplete or does not occur. In such cases the treatment of p-toluene sulfonic acid with $HNO_3$ results in the production of p-sulfo benzoic acid. Thus replacement of the sulfo group does not occur.

EXAMPLE 4

Thirty-five grams (0.18 mol) p-toluenesulfonic acid monohydrate and 110 ml. 20% $HNO_3$ were heated to 220° C. under 400 psig. nitrogen in a 300 ml. stainless steel autoclave. The remaining 115 ml. of 20% $HNO_3$ (total 4.3:1 mol ratio of $HNO_3$:sulfonic acid) was fed in over 1.5 hours. When addition was complete, the temperature and pressure were maintained at 220° C. and 400 psig. by venting for an additional 2 hours. Twenty-seven grams (0.16 mol) p-nitrobenzoic acid and 10 grams of autoclave corrosion material were filtered from the cooled reaction mixture. The p-nitrobenzoic acid was dissolved in 150 ml. of tetrahydrofuran, the solution filtered to remove undissolved corrosion material, and then concentrated and cooled to crystallize the product. The conversion was 85–90 percent.

EXAMPLE 5

3,4-Dimethylbenzenesulfonic acid sodium salt (30 grams, 0.14 mol) and 110 ml. 20% $HNO_3$ were heated to 220° C. in a 300 ml. autoclave under 400 psig nitrogen. After an additional 115 ml. 20% $HNO_3$ (total $HNO_3$:sulfonic acid mole ratio of 5.6:1) had been added, the reaction was continued at the designated temperature and pressure for 2 hours. The reaction mixture was evaporated to dryness on the steam bath and the residue dissolved in water. Addition of $NaHCO_3$ and NaOH precipitated a tan-colored solid which was recovered by filtration. The filtrate was acidified with HCl but only a small amount of colorless precipitate formed. The acidic solution was evaporated to dryness and extracted with ethanol to yield 10 grams of a tan-colored viscous material. This material solidified upon addition of ether. On filtering, the tan color went into the ethereal filtrate, leaving a colorless solid of 10 grams m.p. 80°–90° C. (33 percent conversion). Nuclear magnetic resonance (NMR) spectra indicated the solid to be 4-nitrophthalic acid.

EXAMPLE 6

4.9 grams of potassium p-ethylbenzenesulfonate (prepared from p-ethyl benzene sulfonyl chloride) and 50 ml. of 20 percent nitric acid (8:1 mol ratio) were heated and shaken in a titanium lined shaker bomb of 500 cubic centimeters filling capacity at 220° C. for 4 hours at an estimated pressure of 1,200–1,500 p.s.i.g. After cooling, the bomb was opened and the product filtered by suction, washed with water and dried in 100° C. over to give 2.8 grams of p-nitrobenzoic acid (m.p. 238°–240° C., 71 percent yield).

EXAMPLE 7

16 grams of p-cumenesulfonic acid (anhydrous), 8 grams of $KNO_3$ and 220 ml. of 15% $NHO_3$ (8:1 mol ratio) were heated and shaken at 210° C. in a titanium lined shaker bomb of 500 cubic centimeters filling capacity for 8 hours at an estimated pressure of 1,200–1,500 psig. After cooling the bomb was opened and the product filtered by suction, washed with water and dried at 100° C. to give 9.1 grams of p-nitrobenzoic acid (m.p. 236°–238° C., 68 percent yield).

EXAMPLE 8

6.5 grams of potassium 4'-methyl-4-diphenylsulfonate and 40 ml. of 20% $HNO_3$ (6.3:1 mol ratio) were heated and shaken in a titanium lined shaker bomb of 500 cubic centimeters filling capacity at 210° C. for 8 hours at an estimated pressure of 1,200–1,500 psig. After cooling the bomb was opened, the product filtered by suction, washed well with water and dried, in a 100° C. oven to give 1.65 grams of 4-nitro-4'-diphenylcarboxylic acid (m.p. 326°–328° C., IR 5.95$\mu$ and 6.65$\mu$, 30 percent yield).

Its methyl ester was made from $CH_2N_2$ in ether. The melting point of methyl 4'-methyl-4-diphenylcarboxylate was 185°–187° C.

EXAMPLE 9

A platinum lined shaker bomb was charged with 28 grams of p-toluene sulfonic acid (0.147 mol), 180 ml. of 12.5% $HNO_3$ (0.375 mol; 2.6:1 mol ratio) 0.12 gram of $NH_4VO_3$ and 1.0 gram of $Cu(NO_3)_2 \cdot 3H_2O$. The bomb was shaken and heated to 160° C. Oxygen was then let in at a pressure of about 230–240 psig. After 1½ hours the pressure became constant at 660 psig and the temperature was raised to 220° C. The bomb was shaken for another 2 hours. The reaction mixture was cooled, the product filtered, washed with water and dried. 16.2 grams of p-nitrobenzoic acid, m.p. 235°–237°C., were obtained.

EXAMPLE 10

A titanium lined autoclave was charged with 95 grams of calcium p-toluene sulfonate and 400 ml. of water. The automatic release pressure was set at 400 psig, the autoclave closed and heat applied with agitation. When the temperature reached 220° C., 154 ml. of 70% $HNO_3$ was fed into the autoclave over a period of 2 hours. The reaction mass was maintained at 220° C. with agitation for an additional 2 hours and then cooled, filtered and dried. To free it from metal compound impurities, the solid product was extracted with tetrahydrofuran, filtered and evaporated to dryness to give 60.5 grams of p-nitrobenzoic acid with a melting point of 238°–240° C. and a 72 percent yield.

EXAMPLE 11

A titanium lined autoclave was charged with 81 grams of copper p-toluene sulfonate and 320 ml. of water. The automatic release pressure was set at 400 psig, the autoclave closed and heat applied with agitation. When the temperature reached 220° C., 123 ml. of 70% $HNO_3$ was fed into the autoclave over a period of 2 hours. The reaction mass was maintained at 220° C. with agitation for an additional 2 hours, cooled, filtered and the product washed and dried. The product was 60.5 grams of p-nitrobenzoic acid with a melting point of 238.5°–240° C. and a yield of 55 percent.

EXAMPLE 12

The detailed procedure of Example 10 was followed using 80 grams of cobalt p-toluene sulfonate, 320 ml. of water and 123 ml. of 70% $HNO_3$ giving 43.4 grams of p-nitrobenzoic acid with a melting point of 237°–239° C. and a yield of 65 percent.

EXAMPLE 13

The detailed procedure of Example 10 was followed using 80 grams of nickel p-toluene sulfonate, 320 ml. of water and 123 ml. of 70% $HNO_3$ to give 42.0 grams of p-nitrobenzoic acid of melting point 238.5°–240° C. and a 63 percent yield.

EXAMPLE 14

A platinum lined autoclave was charged with 90 grams of potassium p-toluene sulfonate (0.429 mol); 300 ml. of water and 5.4 ml. of concentrated HBr. The mixture was heated under agitation to 200° C. Air was sparged through the agitated mixture under pressure to an internal pressure of 900 psig. Pressurization with air was maintained at about the pressure of 900 psig for 2 hours at 200° C. At this stage in the reaction the conversion to the sulfo benzoic acid was practically complete according to thin layer chromatography.

Pressurization with air was discontinued and 90 ml. of 70 percent aqueous nitric acid (1.0 mol) was pumped under pressure into the aqueous reaction mixture over a period of 1 hour. The reaction temperature was then raised to 230° C. and held there for 1.5 hours. The autoclave was cooled to room temperature, vented, and the contents removed and filtered. The recovered solid, p-nitrobenzoic acid, was washed with water and dried. The yield was 50.3 grams, m.p. 236°–238° C.

The p-nitrobenzene and biphenylcarboxylic acid obtainable by this invention are useful intermediates in the production of dyes and pharmaceuticals. For example, p-nitrobenzoic acid may be reduced to p-aminobenzoic acid which is generally known to be the starting material for producing dyes. The p-aminobenzoic acid is of outstanding biological importance as a vitamin belonging to the B complex. In addition, p-nitrobenzoic acid can be used to produce the ethyl ester of p-aminobenzoic acid which is benzocaine, a known anesthetic. Other p-nitrobenzoic acids of this invention can be used to produce the lower alkyl esters of the corresponding p-aminobenzoic acid which have anesthetic properties.

In addition, the p-aminobenzoic and 4'-amino-4-biphenylcarboxylic acids can be converted to their corresponding aminobenzene or diphenylcarbonyl chloride hydrochlorides and condensed high molecular weight polymers. Fibers and films from these polymers have high thermal stability. Similarly the p-aminobenzene dicarboxylic and 4'-amino-4-biphenyl-dicarboxylic acids can be condensed with aromatic diamines to form high molecular weight polyamides useful for films, filaments and fibers.

The foregoing detailed description has been given for clearness of understanding only, and no unnecessary limitations are to be understood therefrom. The invention is not limited to the exact details shown and described, as obvious modifications will occur to those skilled in the art.

What is claimed is:

1. A process for the preparation of p-nitrobenzoic and 4'-nitro-4-biphenylcarboxylic acids which comprises contacting a p-sulfobenzoic or 4'-sulfo-4-biphenylcarboxylic acid of the formula,

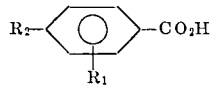

wherein $R_1$ is selected from the group consisting of hydrogen and carboxyl and $R_2$ is selected from the group consisting of sulfo and a p-sulfophenyl group with at least 1 molar proportion of nitric acid as a 5–60 percent by weight aqueous solution in the liquid phase at a temperature of from 120°–300° C. and recovering a p-nitrobenzoic or a 4'-nitro-4-biphenylcarboxylic acid.

2. The process of claim 1 wherein the nitric acid concentration is 15–30 percent.

3. The process of claim 1 wherein the reaction temperature is in the range 180°–250° C.

4. The process of claim 1 wherein p-sulfobenzoic acid, p-$HO_3S$—$C_6H_4$—$CO_2H$, is contacted with 1 to 4 mols of the nitric acid per mol of the p-sulfobenzoic acid, and the product is p-nitrobenzoic acid.

5. The process for the preparation of p-nitrobenzoic and 4'-nitro-4-biphenylcarboxylic acids which comprises contacting a p-alkylbenzenesulfonic acid or biphenylsulfonic acid of the formula

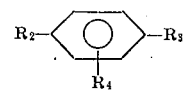

where $R_2$ is selected from the group consisting of sulfo and a p-sulfophenyl group, $R_3$ is a primary or secondary alkyl group of one to five carbon atoms, and $R_4$ is selected from the group consisting of hydrogen, a primary or secondary alkyl group of one to five carbon atoms and a carboxyl group, with at least $1 + 2y$ mols of nitric acid in 5–60 percent by weight aqueous solution wherein $y$ is the number of carbon atoms in $R_3$ and $R_4$ combined when $R_3$ and $R_4$ are alkyl or with a combination of $1 + y$ mols of nitric acid in a 5–60 percent by weight aqueous solution with at least $y$ mols of oxygen as molecular oxygen containing gas at a temperature of 120°–300° C.

6. The process of claim 5 wherein the reaction temperature is in the range 180°–250° C.

7. The process of claim 5 wherein the nitric acid concentration is 15 to 30 percent.

8. The process of claim 5 wherein the amount of nitric acid only is in the range $1 + 2y$ to $4 + 2y$ mols and $1 + y$ to $4 + y$ mols when nitric acid is used in combination with $1y$ to $1.5y$ mols of the oxygen as molecular oxygen containing gas.

9. The process of claim 5 wherein the sulfonic acid contacted is in the form of a metal sulfonate hydrolyzable to the sulfonic acid form in aqueous nitric acid.

10. The process of claim 5 wherein the sulfonic acid is p-toluenesulfonic acid.

11. The process of claim 5 wherein potassium p-ethylbenzenesulfonate is substituted for the sulfonic acid.

12. The process of claim 5 wherein the sulfonic acid is 3,4-dimethylbenzenesulfonic acid.

13. The process of claim 5 wherein the sulfonic acid is p-cumenesulfonic acid.

14. The process of claim 5 wherein potassium 4'-methyl-4-biphenylsulfonate is substituted for the sulfonic acid.

* * * * *